Figure 1:
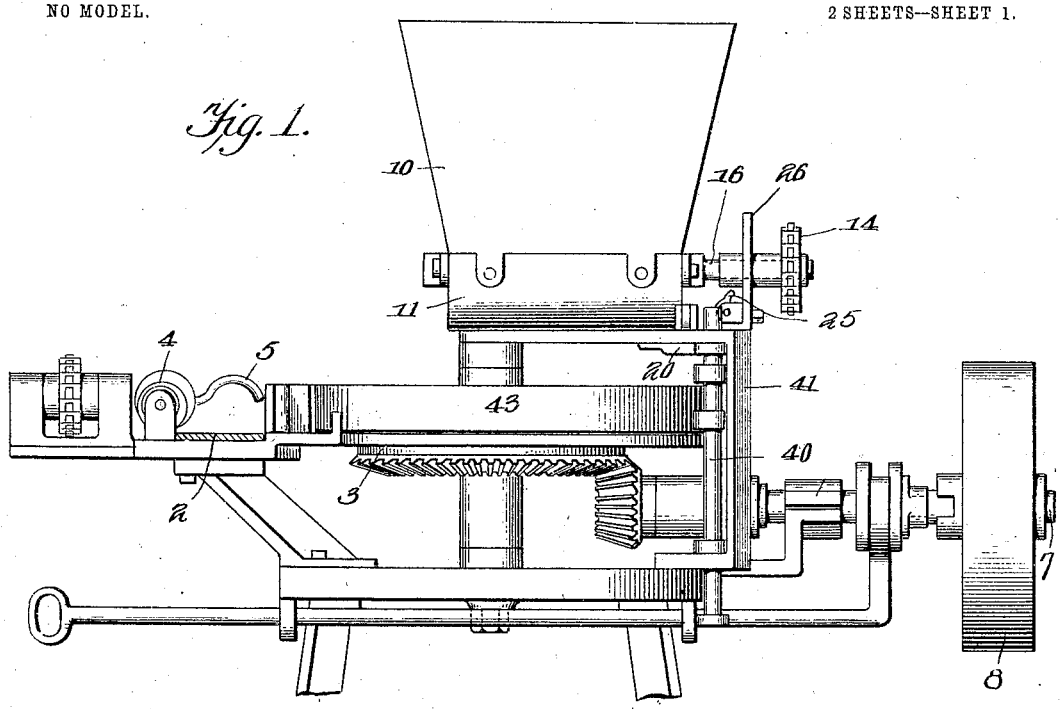

No. 778,043. PATENTED DEC. 20, 1904.
J. KELLINGTON.
MACHINE FOR AUTOMATICALLY MEASURING AND DELIVERING MATERIAL.
APPLICATION FILED JUNE 13, 1904.
NO MODEL. 2 SHEETS—SHEET 1.

WITNESSES:
O. W. Holmes.
John T. Schrott.

INVENTOR
John Kellington.
BY
Fred G. Dieterich
ATTORNEY

No. 778,043. PATENTED DEC. 20, 1904.
J. KELLINGTON.
MACHINE FOR AUTOMATICALLY MEASURING AND DELIVERING MATERIAL.
APPLICATION FILED JUNE 13, 1904.
NO MODEL. 2 SHEETS—SHEET 2.
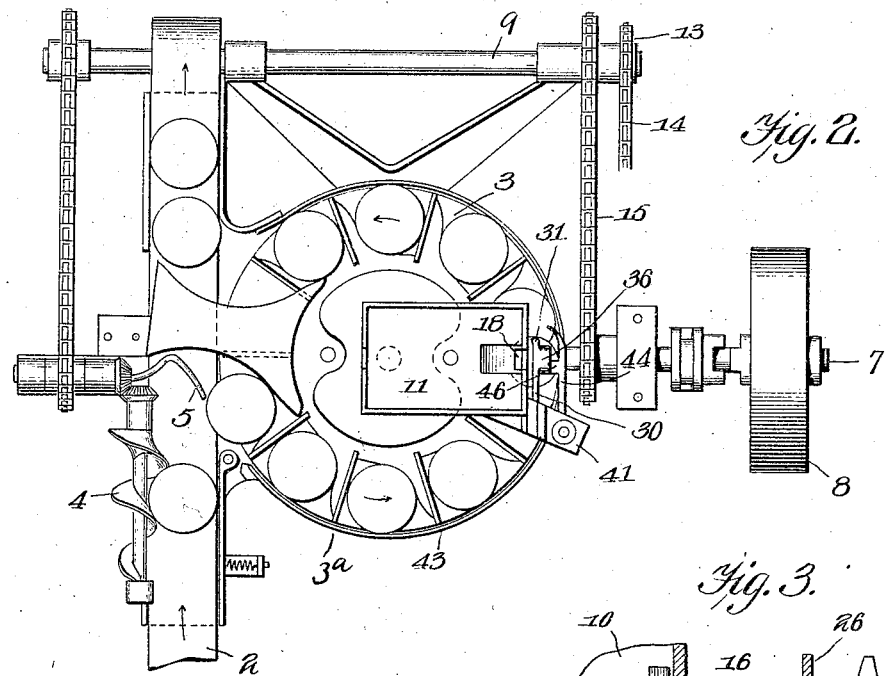
Fig. 2.
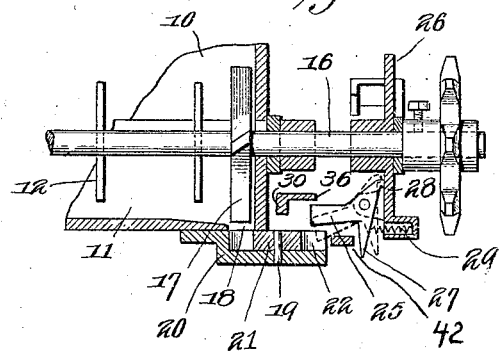
Fig. 3.
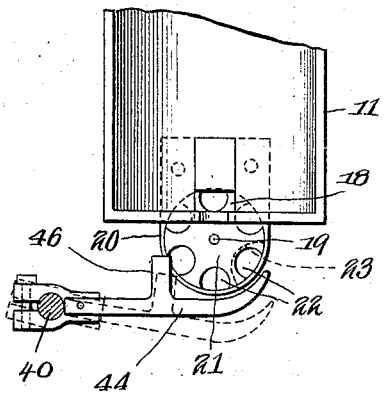
Fig. 7.
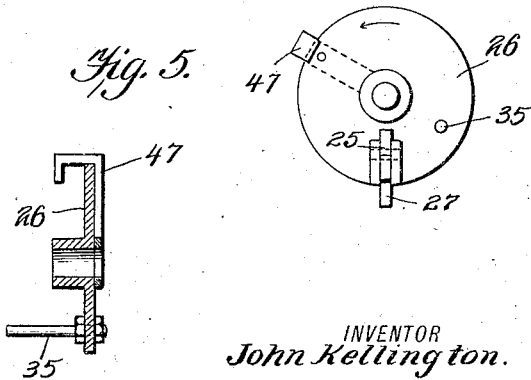
Fig. 5.
Fig. 4.
WITNESSES:
O. H. Holmes.
John T. Schrott.
INVENTOR
John Kellington.
BY
Fred G. Dieterich
ATTORNEY No. 778,043.

Patented December 20, 1904.

UNITED STATES PATENT OFFICE.

JOHN KELLINGTON, OF NEW WESTMINSTER, CANADA, ASSIGNOR OF ONE-HALF TO DANIEL J. MUNN AND ALEXANDER EWEN, OF NEW WESTMINSTER, BRITISH COLUMBIA, CANADA.

MACHINE FOR AUTOMATICALLY MEASURING AND DELIVERING MATERIAL.

SPECIFICATION forming part of Letters Patent No. 778,043, dated December 20, 1904.

Application filed June 13, 1904. Serial No. 212,428.

*To all whom it may concern:*

Be it known that I, JOHN KELLINGTON, a citizen of the Dominion of Canada, residing at New Westminster, in the Province of British Columbia, Canada, have invented a new and useful Improvement in Machines for Automatically Measuring and Delivering Material, of which the following is a specification.

My invention relates to a machine for automatically measuring and delivering material into receptacles provided, and although initially designed to measure and deliver salt to filled cans of fish or meat its mechanism is equally applicable with slight modifications in the matter of size and form of parts to the broader field of measuring and delivering into receptacles or packages material of any character that is susceptible of flowing or being packed under similar circumstances as the salt.

The present application is an improvement on a machine previously patented by me, which patent was issued on the 14th of October, 1902, and numbered 711,426.

The general design of the machine is the same as the one previously patented, and the same principle is followed of returning the can or other receptacle into which the material has been delivered to the original line of movement.

The improvements in the machine on which the present application for a patent is made lie in the more positive and regular means for bringing the receptacles under the feed and in a more precise mechanism for the delivery of the material to the can or other receptacle which operates such delivery.

The construction and operation of my invention as adapted to a machine for delivering salt to filled cans is fully described in the following specification and illustrated in the drawings which accompany it.

Figure 6:
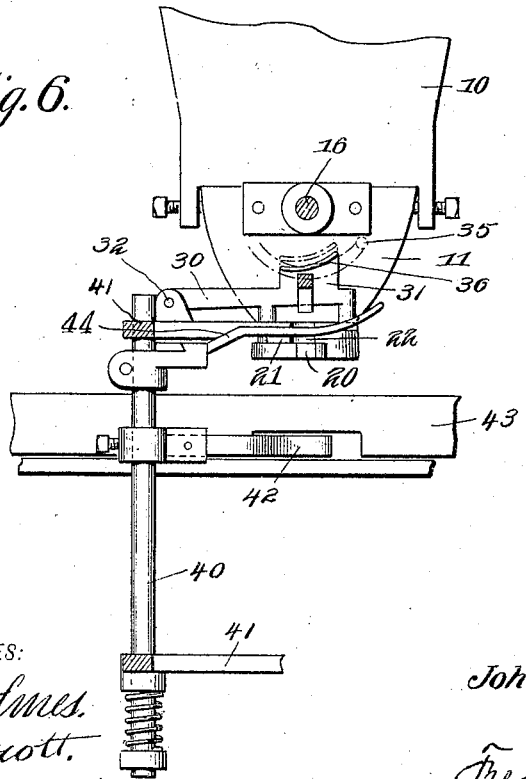

Figure 1 is an end elevation; Fig. 2, a plan with the salt-box, agitator-spindle, and its attached parts removed; Fig. 3, an enlarged sectional detail of the salt-feed mechanism; Fig. 4, a view of that face of the operating-disk toward the salt-gage wheel; Fig. 5, a section of the disk; Fig. 6, an end view of the gage mechanism with the disk removed, and Fig. 7 a plan of the gage-wheel and adjacent parts.

As shown in Fig. 2, the cans or other required receptacles are brought to the machine by a conveyer-band 2, moving in the direction indicated by the arrows, and they are spaced by the spiral feeds 4 and 5 into the rotatable carrier 3, which moves the cans under the salt-feed. This spacing device having been the subject of previous patents does not require extended reference in this connection.

The carrier 3 is rotated, by means of a bevel-wheel and pinion, from the first motion-shaft 7 of the machine, which is driven by means of the pulley 8.

Supported above the carrier 3 on the frame 41 and extending toward the side of the machine opposite to the conveyer 2, which brings the cans to and takes them from it, is a wood-lined salt box or hopper 10, having in its base part 11 a rotatable agitator 12, the spindle 16 of which is driven by a chain 14 from a sprocket 13 on the shaft 9, which drives the conveyer-band 2 and is itself driven from the first motion-shaft 7 by a chain 15 over sprocket-wheels on each.

Toward one end of the agitator-spindle 16 within the salt-box is a four-bladed presser 17, having angled and curved blades that will press the salt toward the delivery end of the box and into the outlet 18.

Rotatable on a pin 19, upwardly projecting from a support 20, secured to the bottom of the salt-box under the outlet 18, is a gage-wheel 21, provided round its outer edge with a number of regularly-spaced apertures or pockets 22, the size of which apertures is designed to hold a sufficient quantity of salt for the requirements of each can.

The axis of rotation of the gage-wheel 21 is so placed that one side of the wheel only passes under the outlet 18 of the salt-box, and the gage-wheel 21 is recessed into its support 20, so that the gage-wheel fits between the support and the under side of the salt-box.

The gage-wheel 21 is rotated, when required to do so, by means of a pawl 25, which is pivotally mounted on the adjacent face of a disk 26, secured toward the outer end of the agitator-spindle 16, so as to be rotatable with it, the speed of the disk being such that one revolution of the disk will be made during the passage of one space of the can-carrier past the salt discharge.

The pawl 25 is provided with a tailpiece 27, outwardly projecting beyond the diameter of the disk, the reason for which will be explained later, and this pawl is retained normally against a check 28 by a spring 29, as shown in Fig. 3, in which position the pawl will not engage with and rotate the gage-wheel.

The gage-wheel support 20 is provided with a discharge-outlet 23 (shown in dotted lines in Fig. 7) at an angular distance from the outlet 18 equal to the feed rotation of the gage-wheel 21, and pivotally supported on a pin 32 on the support-frame 41 of the salt-box is a lever 30, the knock-out end 31 of which is over the discharge-outlet 23 of the support and is designed to enter one of the pockets of the gage-wheel when such is in alinement with the discharge-outlet 23.

In its normal position the knock-out end of this lever 30 rests in a pocket of the gage-wheel, and the lever is lifted and dropped synchronously with the movement of a can-carrying space of the carrier 3 past the point of salt discharge. This lifting and dropping of the lever 30 is effected by a pin 35, projecting from the disk 26, which pin engages an outwardly-turned cam-shaped flange 36, forming part of the lever 30 and projecting into the path of the pin 35 as the disk rotates. Thus with each revolution of the disk, which is synchronous with the passage of one carrier-space of the carrier 3 past the salt-discharge, the lever is raised clear of the gage-wheel 21, permitting it to be turned if a can is in position in the space of the carrier, and the lever is thereafter dropped.

As it is desirable that the salt discharge shall not take place unless a can occupies a space in the carrier 3 immediately beneath the discharge-outlet 23, the movement of the gage-wheel by means of the pawl 25 is effected in the following manner: Secured on a vertical spring-controlled spindle 40, which spindle is movable in bearings in the frame 41, which supports the salt-box, is a lever 42, having a curved end which projects through an aperture in the band 43, which surrounds the can-carrier 3, and into the path of the cans which may be on the carrier. Toward the upper end of this spindle 40 a lever 44 is secured, which projects in the plane of the gage-wheel between that wheel and the disk 26, which carries the operating-pawl. The position of this lever is such that when it is moved back it will project into the path of the tail 27 of the pawl 25, and the free end of the lever is curved upward to approximate to the circular path of this pawl-tail and away from the disk to afford an inclined engagement. Thus when a can approaches the position of the salt discharge it engages the lever 42 and presses it, and with it the lever 44 back, and in this position the outer edge of 44 engages the tail 27 of the pawl 25, which depresses the outer end of the pawl and brings it into a position that will engage one of the pockets 22 of the gage-wheel 21, thus bringing a salt-filled pocket in alinement with the discharge-aperture 23 of the support. The same rotation of the disk which effects the rotation of the gage-wheel also carries the pin 35 of the disk beyond the limit of the flange 36, projecting from the lever 30, so that as soon as the salt-filled pocket is brought over the discharge-aperture 23 the knock-out lever is dropped and the charge of salt is dropped into the can beneath.

To insure that the lever 42 is restored to its normal position, projecting into the path of the cans on the carrier 3, a projection 47 on the disk 26 engages the outer edge of the lever 44 and presses it back into its normal position, and at the same time a projection 46 on the lever 44 bears against the outer edge of one of the pockets of the gage-wheel and insures that a pocket is in correct alinement under the outlet 18 of the salt-box.

It will be noticed that the agitator and its attached disk are rotatable as long as the machine is in operation and the knock-out lever is rising and falling again with each revolution; but unless a can is passing under the salt-discharge outlet 23 the gage-wheel 21 is not rotated, and therefore a filled pocket of salt is not over the discharge-aperture and the can-space beneath. As soon, however, as a can moves under the discharge-aperture the pawl is by means of the levers 42 and 44 thrown down into the position shown by dot-and-dash lines in Fig. 3, so that the gage-wheel will be engaged by it and rotated, and a full charge of salt will be moved over the discharge-aperture 23. The amount of material required for any particular pack may be varied by a change in the thickness of the gage-wheel, provision for which is made in the construction, as also are the several parts for adaptability of the machine to various sizes of cans or other receptacles whether of diameter or depth.

Where the machine is intended for use in measuring and delivering material into receptacles which may not have sufficient rigidity to operate the lever 42, that lever may be so placed as to be operated by the division $3^a$ of the carrier 3, and care must be taken that a receptacle occupies each space of the carrier.

Having now particularly described my in vention, what I claim as new, and desire to be protected in by Letters Patent, is—

1. In a machine for delivering a measured quantity of material into receptacles provided, the combination with a rotatable table having a series of receptacle-holding divisions on its upper side, a vessel over the table having an outlet on its under side, a revoluble gage-wheel having through-pockets which may be brought in alinement with the outlet of the vessel and arranged eccentrically to and parallel with the rotatable table, a recessed bracket supporting the gage-wheel, a discharge-aperture in the bracket in alinement with the gage-pockets and situated at an angular distance from the outlet of the vessel, means for rotating the gage-wheel an amount equal to the angular distance between the outlet of the vessel and the discharge-aperture in the bracket, means for rotating the table carrying the receptacles, and means for rotating the gage-wheel coöperatively therewith.

2. In a machine of the character described, a rotatable table, receptacle-holding divisions on the upper side of the table, a conveyer-band for carrying cans to and removing the same from the rotatable table, means for moving the cans from the conveyer-band onto the table, and means for removing the cans from the table onto the conveyer-band, a vessel disposed above said table over the path of the cans on the table, and a rotatable gage-disk eccentrically and parallelly disposed with respect to the rotatable table and between said vessel discharge, substantially as shown and for the purposes described.

3. In a machine for the purpose specified, the combination with a vessel adapted to hold the material it is designed to gage and means for conveying receptacles thereunder, of an outlet in the bottom of the vessel over the path of the receptacles, a gage-disk having gage-pockets round its outer edge, and being rotatable beneath the vessel in such a manner that its pockets may be brought into alinement with the outlet, a recessed bracket supporting the gage-disk, a discharge-aperture in the supporting-bracket at an angular distance from the outlet in the base of the vessel equal to the feed movement of the disk, means for rotating the gage-disk coöperatively with the movement of a receptacle beneath the discharge-aperture.

4. In a machine for the purpose specified having a rotatable table onto which receptacles may be moved from a conveyer-band and having means for restoring the receptacles onto the same band, a vessel above the table, an aperture in the bottom of such vessel, a gage-disk having gage-pockets round its outer edge, a recessed support secured to the under side of the vessel within which support the gage-disk is rotatable and having a discharge-aperture situated at an angular distance from the outlet of the vessel in the direction of rotation of the disk, means for rotating the gage-disk comprising a pivotally-mounted pawl and a disk rotatable adjacent to the gage-disk, such pawl having a tail portion, a lever for engaging with said tail portion, a corresponding lever coöperating with said tail-portion-engaging lever projecting in the path of the receptacles on the rotatable table so that when a can is passing under the discharge-aperture of the gage-disk support the lever adjacent to the pawl-tail will throw the pawl into engagement with the pockets in the gage-disk and rotate the same.

5. In a machine for the purpose specified having a vessel and a means for feeding and spacing receptacles thereunder, an outlet in the base of the vessel, a disk having gage-pockets through its thickness rotatable beneath the outlet in such a position that the pockets of the disk may be brought into alinement with the outlet of the vessel, a recessed support sustaining the disk and having a discharge-aperture in alinement with the gage-pockets of the disk at an angular distance from the outlet of the vessel equal to the feed movement of the disk, an operating-disk rotatable adjacent to the gage-disk having a pivotally-mounted pawl which may be thrown into engagement with the gage-disk so as to rotate it, means for throwing the pawl into engagement with the disk comprising a lever fixed on a vertical spindle and projecting into the path of the receptacles as they pass under the salt-discharge apertures, a lever secured to the same vertical spindle adjacent to the pivotally-mounted pawl and so adjusted that the presence of a receptacle opposite to the first-named lever will move the second-named lever into operative proximity to the pawl on the rotatable operating-disk and move the pawl into engagement with the gage-disk so that the latter is moved the required angular distance to bring a gage-pocket of the disk from opposite the outlet of the vessel to a position opposite the discharge-aperture of the support.

6. In a machine of the class described, the combination with a vessel and means for moving cans thereunder, of a disk having gage-pockets therethrough, a recessed support in which the gage-disk is rotatable having a discharge-aperture at an angular distance from the outlet of the vessel, means for rotating the gage-disk coöperatively with the movement of a receptacle beneath the discharge-aperture, a pivotally-mounted lever having a plunger end, and means for lifting and dropping the lever whereby the material may be knocked out of the pocket in the gage-wheel and is discharged through the aperture in the support and into a receptacle beneath.

7. In a machine of the class described having a rotatable table, receptacle-holding compartments on such table, a vessel over the path of the cans on the table having an outlet in its under side, means for agitating the material within the vessel and moving it to the outlet, a gage-disk having gage-pockets through its thickness and rotatable beneath the outlet in a recessed support secured to the under side of the vessel, which support has a discharge-aperture at an angular distance from the outlet of the vessel, a pivotally-mounted lever designed to enter and knock the material out of a pocket in the gage-disk and through the discharge-aperture in its support, means for rotating the gage-disk coöperatively with the movement of a receptacle beneath the discharge-aperture, means for correcting the position of the gage-disk and locking the same, and means for lifting and releasing the knock-out lever.

In testimony whereof I have signed my name to this specification in the presence of two subscribing witnesses.

JOHN KELLINGTON.

Witnesses:
  E. J. ROWLAND,
  CHAS. LUCKEY.